US012665965B2

(12) United States Patent
Bae et al.

(10) Patent No.: US 12,665,965 B2
(45) Date of Patent: Jun. 23, 2026

(54) FOLDABLE DISPLAY AND ELECTRONIC DEVICE COMPRISING SAME

(71) Applicant: SAMSUNG ELECTRONICS CO., LTD., Suwon-si (KR)

(72) Inventors: Jaehyun Bae, Suwon-si (KR); Youngmin Moon, Suwon-si (KR); Hyunsuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 250 days.

(21) Appl. No.: 18/419,077

(22) Filed: Jan. 22, 2024

(65) Prior Publication Data

US 2024/0163356 A1     May 16, 2024

Related U.S. Application Data

(63) Continuation of application No. PCT/KR2022/007865, filed on Jun. 2, 2022.

(30) Foreign Application Priority Data

Jul. 26, 2021     (KR) ........................ 10-2021-0097890

(51) Int. Cl.
*H04M 1/02* (2006.01)

(52) U.S. Cl.
CPC ....... *H04M 1/0268* (2013.01); *H04M 1/0216* (2013.01); *H04M 2201/38* (2013.01)

(58) Field of Classification Search
CPC .... H04M 1/02; H04M 1/0206; H04M 1/0208; H04M 1/0214; H04M 1/0216;

(Continued)

(56) References Cited

U.S. PATENT DOCUMENTS 9,069,521 B2     6/2015 Lee et al.
9,423,639 B2     8/2016 Hongo et al.
(Continued)

FOREIGN PATENT DOCUMENTS

CN       211742521 U     10/2020
KR       10-1684344 B1     12/2016
(Continued)

OTHER PUBLICATIONS

International Search Report dated Sep. 13, 2022, issued by the International Searching Authority in International Application No. PCT/KR2022/007865 (PCT/ISA/210).
(Continued)

*Primary Examiner* — Quochien B Vuong
(74) *Attorney, Agent, or Firm* — Sughrue Mion, PLLC

(57)     ABSTRACT

An electronic device includes: a first housing; a second housing; a hinge structure foldably connecting the first housing and the second housing to each other; and a flexible display including a first portion on the first housing and a second portion on the second housing, the flexible display being foldable according to folding of the first housing and the second housing with respect to each other, wherein the flexible display may include a glass layer, the glass layer may include a flexible part that is bendable and may include a plurality of slits, and at least a portion of a side surface of each of the plurality of slits may include a rough surface.

20 Claims, 10 Drawing Sheets

(58) Field of Classification Search
CPC .. H04M 1/026; H04M 1/0266; H04M 1/0268;
H04M 2201/38; G06F 1/16; G06F
1/1601; G06F 1/1616; G06F 1/1652;
B32B 3/266; B32B 17/06
See application file for complete search history.

(56) References Cited

U.S. PATENT DOCUMENTS

| | | | |
|---|---|---|---|
| 9,504,170 B2 * | 11/2016 | Rothkopf | H04M 1/0216 |
| 10,416,721 B2 | 9/2019 | Shin et al. | |
| 10,571,962 B2 * | 2/2020 | Araki | H04M 1/0268 |
| 10,579,105 B2 | 3/2020 | Jones et al. | |
| 10,600,989 B1 | 3/2020 | Ai et al. | |
| 11,360,517 B2 | 6/2022 | Paek et al. | |
| 11,610,520 B2 | 3/2023 | Park et al. | |
| 2017/0092884 A1 | 3/2017 | Zhang et al. | |
| 2018/0187051 A1 | 7/2018 | Won et al. | |
| 2020/0313111 A1 * | 10/2020 | Kim | H04M 1/0268 |
| 2020/0319672 A1 | 10/2020 | Kim et al. | |
| 2020/0342789 A1 | 10/2020 | Park et al. | |
| 2021/0118337 A1 | 4/2021 | Park et al. | |
| 2021/0191467 A1 | 6/2021 | Sunwoo et al. | |
| 2021/0315116 A1 | 10/2021 | Sunwoo et al. | |
| 2022/0147107 A1 | 5/2022 | Wang et al. | |
| 2022/0189347 A1 * | 6/2022 | Oh | G06F 1/1652 |

FOREIGN PATENT DOCUMENTS

| | | |
|---|---|---|
| KR | 10-2017-0023231 A | 3/2017 |
| KR | 10-2017-0122554 A | 11/2017 |
| KR | 10-2018-0079094 A | 7/2018 |
| KR | 10-2146730 B1 | 8/2020 |
| KR | 10-2020-0108754 A | 9/2020 |
| KR | 10-2167404 B1 | 10/2020 |
| KR | 10-2021-0047616 A | 4/2021 |

OTHER PUBLICATIONS

Written Opinion dated Sep. 13, 2022, issued by the International Searching Authority in International Application No. PCT/KR2022/007865 (PCT/ISA/237).
Communication issued Sep. 13, 2024 by the European Patent Office in European Patent Application No. 22849702.0.
Communication dated Feb. 26, 2026 issued by the Korean Ministry of Intellectual Property in Korean Patent Application No. 10-2021-0097890.

* cited by examiner

FOLDABLE DISPLAY AND ELECTRONIC DEVICE COMPRISING SAME

CROSS-REFERENCE TO RELATED APPLICATION(S)

This application is a continuation application of International Application No. PCT/KR2022/007865, filed on Jun. 2, 2022, which claims priority to Korean Patent Application No. 10-2021-0097890, filed on Jul. 26, 2021, in the Korean Intellectual Property Office, the disclosures of which are incorporated by reference herein in their entireties.

BACKGROUND

1. Field

The disclosure relates to a foldable display and an electronic device including the foldable display.

2. Description of Related Art

A mobile electronic device such as a smart phone can provide various functions such as call, video playback, and internet search, based on various types of applications. A user may want to use the various functions described above through a wider screen, but the larger the screen of the electronic device, the less portable it is. Accordingly, a foldable electronic device capable of enhancing portability by utilizing a folding structure has been provided. For example, the foldable electronic device can include a hinge structure and a first housing and a second housing connected along a direction of facing each other to be foldably connected to each other by the hinge structure. Such a foldable electronic device can include a foldable display disposed to cross the first housing and the second housing in a flat state. The foldable display and windows laminated on the display can be formed of a flexible material.

A display surface of a foldable electronic device can be damaged due to repeated folding of the foldable electronic device. In particular, a bending area of the foldable electronic device can be deformed due to stress as a compressive force and a tensile force are applied thereto. In order to prevent a surface damage of a display and improve strength performance, a window glass of the display can include a pattern including a plurality of slits and a filling member for filling and visually hiding a pattern area. However, there is a problem in that the display is peeled off due to a small adhesive area and a frictional force between the window glass and the filling member because of a bending operation of the foldable display.

Summary According to an aspect of the disclosure, an electronic device includes: a first housing; a second housing; a hinge structure foldably connecting the first housing and the second housing to each other; and a flexible display including a first portion on the first housing and a second portion on the second housing, the flexible display being foldable according to folding of the first housing and the second housing with respect to each other, wherein the flexible display may include a glass layer, the glass layer may include a flexible part that is bendable and may include a plurality of slits, and at least a portion of a side surface of each of the plurality of slits may include a rough surface.

The flexible part may include: a first area; and a second area that is closer than the first area to a bending axis of the glass layer, and the rough surfaces of slits in the second area, among the plurality of slits, may have a roughness that is greater than a roughness of the rough surfaces of slits in the first area, among the plurality of slits.

A roughness of the rough surface of each slit of the plurality of slits may increase from an end of the slit toward a center of the slit.

The glass layer may further include a first surface facing a first direction, and a second surface facing the first surface, and at least a portion of at least one of the first surface or the second surface may include a second rough surface.

The at least one of the first surface or the second surface including the second rough surface may be in an area between the plurality of slits.

The glass layer may further include a first surface facing a first direction and a second surface facing the first surface, and the flexible display may further include a filling member facing at least one of the first surface or the second surface and filled inside at least one of the plurality of slits.

The flexible part may further include: a first area; and a second area that is closer than the first area to a bending axis of the glass layer or may include the bending axis, and slits in the second area, among the plurality of slits may have a width that is greater than a width of slits in the first area, among the plurality of slits.

The flexible part may further include: a first area; and a second area that is closer than the first area to a bending axis of the glass layer or may include the bending axis, and a thickness of the first area may be greater than a thickness of the second area.

The glass layer may further include a first surface facing a first direction, and a second surface facing the first surface, and the flexible display may further include a filling member facing at least one of the first surface or the second surface and filled inside at least one of the plurality of slits.

The flexible display may further include a film layer on the first surface.

The flexible display may further include a protective layer on the film layer, and the filling member may be filled in at least a part between the film layer and the protective layer.

According to one or more embodiments of the present disclosure, a flexible display that may be capable of preventing a display from being peeled off and an electronic device including the flexible display may be provided.

Also, according to one or more embodiments of the present disclosure, a flexible display that may have improved strength performance and an electronic device including the flexible display may be provided.

In addition to this, various effects identified directly or indirectly through the present disclosure may be provided.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
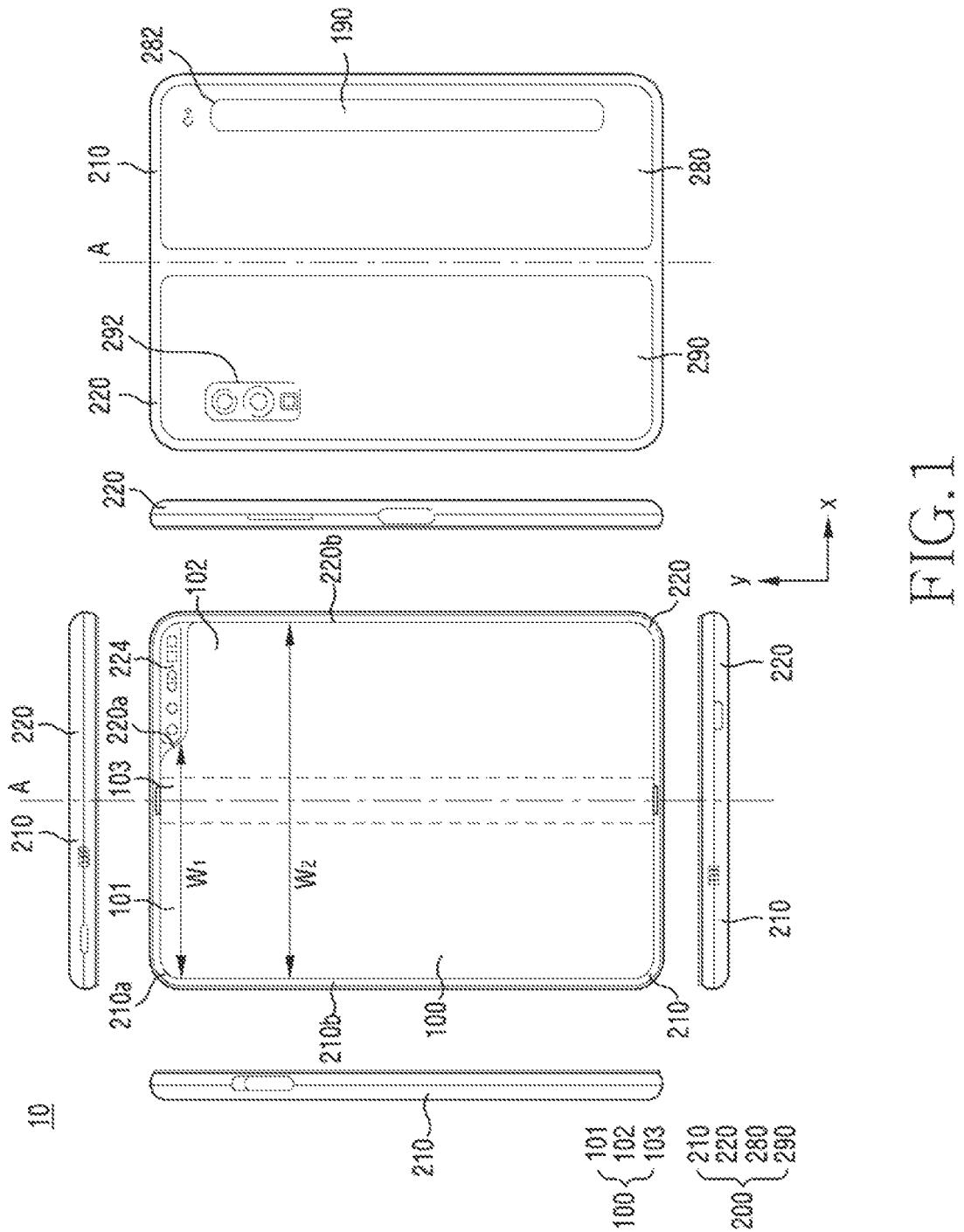
FIG. 1 is a diagram illustrating a flat state of an electronic device according to an embodiment.

Hereinafter, various embodiments of the present disclosure will be described with reference to the accompanying drawings. However, it should be understood that this is not intended to limit the present disclosure to a specific embodiment form, and includes various modifications, equivalents, and/or alternatives of the embodiments of the present disclosure. In the drawings, the same or similar reference numerals may be used for the same or similar components.

Throughout the disclosure, the expression "at least one of a, b or c" indicates only a, only b, only c, both a and b, both a and c, both b and c, or all of a, b, and c.

An electronic device of various embodiments of the present disclosure may include at least one of, for example, a smart phone, a tablet personal computer (PC), a mobile phone, a video phone, an e-book reader, a desktop personal computer, a laptop personal computer, a netbook computer, a workstation, a server, a personal digital assistant (PDA), a portable multimedia player (PMP), an MP3 player, a mobile medical device, a camera, or a wearable device. According to various embodiments, the wearable device may include at least one of an accessory type (e.g., watch, ring, bracelet, anklet, necklace, glasses, contact lens, or head-mounted-device (HMD)), a fabric or clothing integrated type (e.g., electronic clothing), a body attachment type (e.g., a skin pad or tattoo), or a living body implantable type (e.g., an implantable circuit).

In one or more embodiments, the electronic device may be a home appliance. The home appliance may include at least one of, for example, a television, a digital video disk (DVD) player, an audio system, a refrigerator, an air conditioner, a vacuum cleaner, an oven, a microwave oven, a washing machine, an air purifier, a set-top box, a home automation control panel, a security control panel, a TV box, a game console, an electronic dictionary, an electronic key, a camcorder, or an electronic picture frame.

In another embodiment, the electronic device may include at least one of various types of medical devices (e.g., various portable medical measuring devices (blood glucose meter, heart rate monitor, blood pressure monitor, body temperature monitor, etc.), magnetic resonance angiography (MRA), magnetic resonance imaging (MRI), computer tomography (CT), camera, or ultrasonicator, etc.), a navigation device, a global navigation satellite system (GNSS), an event data recorder (EDR), a flight data recorder (FDR), an automotive infotainment device, marine electronics (e.g., marine navigation systems, gyrocompasses, etc.), avionics, a security device, an automotive head unit, an industrial or home robot, an automatic teller's machine (ATM) of a financial institution, a point of sales (POS) of a shop, or Internet of things (e.g., light bulbs, sensors, electric or gas meters, sprinklers, smoke alarms, thermostats, street lights, toasters, exercise equipment, hot water tanks, heaters, boilers, etc.).

According to one or more embodiment, the electronic device may include at least one of a piece of furniture or a building/structure, an electronic board, an electronic signature receiving device, a projector, or various measuring devices (e.g., water, electricity, gas, radio wave measuring devices, etc.). In various embodiments, the electronic device may be one of the various devices described above or a combination of two or more. An electronic device of one or more embodiments may be a flexible electronic device. Also, an electronic device according to embodiments of the disclosure are not limited to the above-described devices, and may include new electronic devices according to technological development.

Figure 2:
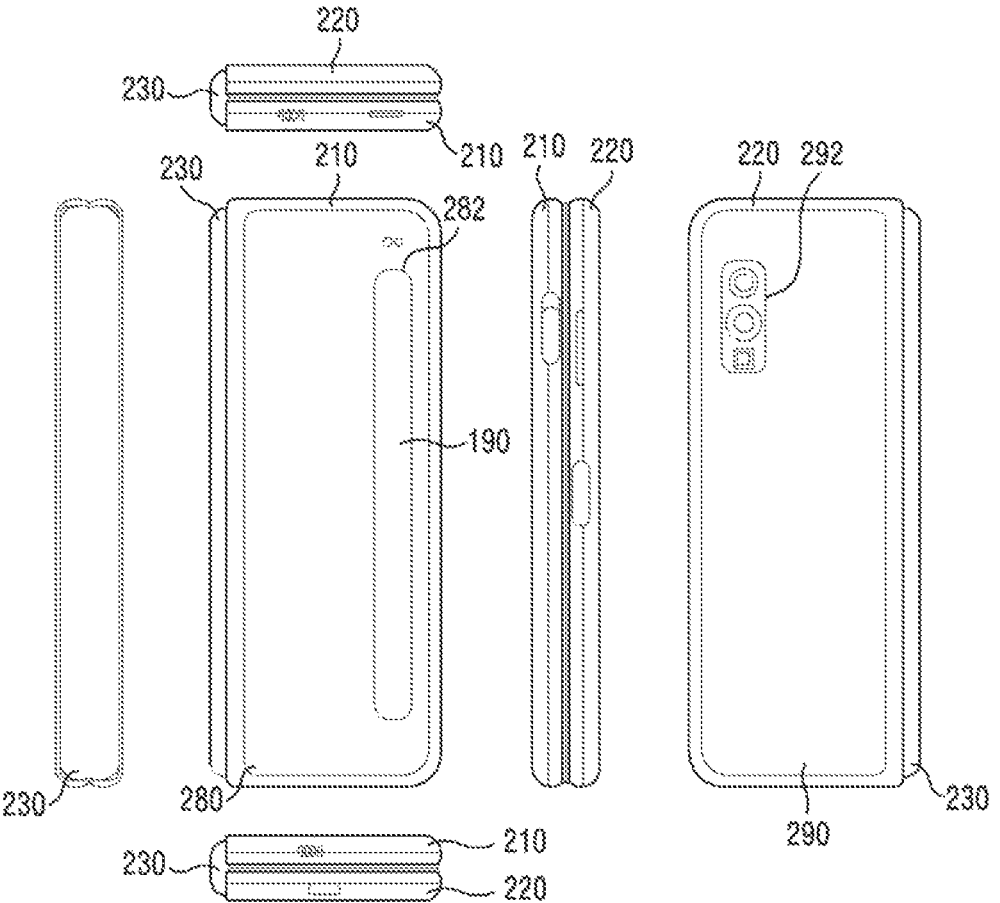
FIG. 2 is a diagram illustrating a folded state of an electronic device according to an embodiment.

Referring to FIG. 1 and FIG. 2, in an embodiment, an electronic device 10 may include a foldable housing 200, a hinge cover 230 covering a foldable portion of the foldable housing, and a flexible or foldable display (hereinafter, referred to as "display") 100 disposed within a space formed by the foldable housing 200. In the present disclosure, a surface on which the display 100 is disposed is defined as a first surface or a front surface of the electronic device 10. And, a surface opposite to the front surface is defined as a second surface or a rear surface of the electronic device 10. Also, a surface surrounding the space between the front surface and the rear surface is defined as a third surface or a side surface of the electronic device 10.

In an embodiment, the foldable housing 200 may include a first housing structure 210, a second housing structure 220 including a sensor area 224, a first rear cover 280, and a second rear cover 290. The foldable housing 200 of the electronic device 10 is not limited to the form and combination shown in FIG. 1 and FIG. 2, and may be implemented by other shapes or the combination and/or coupling of components. For example, in another embodiment, the first housing structure 210 and the first rear cover 280 may be integrally formed, and the second housing structure 220 and the second rear cover 290 may be integrally formed.

As in FIG. 1 for example, the first housing structure 210 and the second housing structure 220 may be disposed at both sides around a folding axis A, and have a shape generally symmetrical with respect to the folding axis A. The first housing structure 210 and the second housing structure 220 may form different angles or distances depending on whether the electronic device 10 is in a flat state, a folded state, or an intermediate state. Unlike the first housing structure 210, the second housing structure 220 may further include the sensor area 224 where various sensors are disposed, and other areas have mutually symmetrical shapes. In an embodiment, the sensor area 224 may be disposed or be replaced in at least a partial area of the second housing structure 220.

In an embodiment, the electronic device 10 may be operated in an in-folding method and/or an out-folding method by rotating the first housing structure 210 relative to the second housing structure 220 in a range of 0 degrees to 360 degrees through a hinge structure. According to one or more embodiments, the hinge structure may be formed in a vertical direction or a horizontal direction when viewing the electronic device 10 from above. According to one or more embodiments, there may be a plurality of hinge structures. For example, the plurality of hinge structures may all be arranged in a same direction. In another example, some hinge structures among the plurality of hinge structures may be arranged and folded in different directions.

In an embodiment, as shown in FIG. 1, the first housing structure 210 and the second housing structure 220 may form a recess accommodating the display 100 together. Due to the sensor area 224, the recess may have two or more different widths in a direction perpendicular to the folding axis A.

For example, the recess may have (1) a first width w1 between a first portion 210*a*, parallel to the folding axis A, of the first housing structure 210 and a first portion 220*a*, formed at a periphery of the sensor area 224, of the second housing structure 220, and (2) a second width w2 formed by a second portion 210*b* of the first housing structure 210 and a second portion 220*b* parallel to the folding axis A without corresponding to the sensor area 224 of the second housing structure 220. In this case, the second width w2 may be formed longer than the first width w1. In other words, the first portion 210*a* of the first housing structure 210 and the first portion 220*a* of the second housing structure 220 having mutually asymmetric shapes may form the first width w1 of the recess, and the second portion 210*b* of the first housing structure 210 and the second portion 220*b* of the second housing structure 220 having mutually symmetrical shapes may form the second width w2 of the recess. In an embodiment, the first portion 220*a* and second portion 220*b* of the second housing structure 220 may have different distances from the folding axis A. The width of the recess is not limited to FIG. 1. In one or more embodiments, the recess may have a plurality of widths due to the shape of the sensor area 224 or the asymmetrical shapes of the first housing structure 210 and second housing structure 220.

In an embodiment, at least a portion of the first housing structure 210 and second housing structure 220 may be formed of a metal material or a non-metal material having a rigidity of a level selected to support the display 100.

In an embodiment, the sensor area 224 may be formed to have a predetermined area adjacent to one corner of the second housing structure 220. However, the arrangement, shape, and size of the sensor area 224 are not limited to the illustrated example. For example, in another embodiment, the sensor area 224 may be provided in another corner of the second housing structure 220 or an arbitrary area between a top corner and a bottom corner. In an embodiment, components for performing various functions embedded in the electronic device 10 may be exposed on a front surface of the electronic device 10 through the sensor area 224 or through one or more openings provided in the sensor area 224. In one or more embodiments, the components may include various types of sensors. The sensor may include, for example, at least one of a front camera, a receiver, a proximity sensor, an illuminance sensor, an iris recognition sensor, an ultrasonic sensor, or an indicator.

The first rear cover 280 may be disposed at one side of the folding axis on the rear surface of the electronic device 10, and may have, for example, a substantially rectangular periphery, and the periphery may be wrapped by the first housing structure 210. Similarly, the second rear cover 290 may be disposed at the other side of the folding axis on the rear surface of the electronic device 10, and its periphery may be wrapped by the second housing structure 220.

The first rear cover 280 and the second rear cover 290 may have substantially symmetrical shapes around the folding axis A. However, the first rear cover 280 and the second rear cover 290 do not necessarily have the mutually symmetrical shapes, and in an embodiment, the electronic device 10 may include various shapes of the first rear cover 280 and the second rear cover 290. In an embodiment, the first rear cover 280 may be formed integrally with the first housing structure 210, and the second rear cover 290 may be formed integrally with the second housing structure 220.

In an embodiment, the first rear cover 280, the second rear cover 290, the first housing structure 210, and the second housing structure 220 may form a space in which various components (e.g., a printed circuit board or a battery) of the electronic device 10 may be disposed. In an embodiment, one or more components may be disposed or visually exposed on the rear surface of the electronic device 10. For example, at least a portion of a sub display 190 may be visually exposed through a first rear area 282 of the first rear cover 280. In another embodiment, one or more components or sensors may be visually exposed through a second rear area 292 of the second rear cover 290. In one or more embodiments, the sensor may include a proximity sensor and/or a rear camera.

Referring to FIG. 2, the hinge cover 230 may be disposed between the first housing structure 210 and the second housing structure 220 and be configured to cover internal components (e.g., a hinge structure). In an embodiment, the hinge cover 230 may be covered by a portion of the first housing structure 210 and second housing structure 220, or be exposed to the outside, according to a state (flat state or folded state) of the electronic device 10.

For example, as shown in FIG. 1, when the electronic device 10 is in a flat state, the hinge cover 230 may not be exposed because it is covered by the first housing structure 210 and the second housing structure 220. For example, as shown in FIG. 2, when the electronic device 10 is in a folded state (e.g., fully folded state), the hinge cover 230 may be exposed to the outside between the first housing structure 210 and the second housing structure 220. For example, when the first housing structure 210 and the second housing structure 220 are in an intermediate state of being folded with a predetermined angle, the hinge cover 230 may be partially exposed to the outside between the first housing structure 210 and the second housing structure 220. However, in this case, the exposed area may be smaller than the fully folded state. In an embodiment, the hinge cover 230 may include a curved surface.

The display 100 may be disposed in the space formed by the foldable housing 200. For example, the display 100 may be seated in the recess formed by the foldable housing 200, and constitute most of the front surface of the electronic device 10.

Accordingly, the front surface of the electronic device 10 may include the display 100, a partial area of the first housing structure 210 adjacent to the display 100, and a partial area of the second housing structure 220. Further, the rear surface of the electronic device 10 may include the first rear cover 280, a partial area of the first housing structure 210 adjacent to the first rear cover 280, the second rear cover 290, and a partial area of the second housing structure 220 adjacent to the second rear cover 290.

The display 100 may refer to a display whose at least partial area may be deformed into a flat or curved surface. In an embodiment, the display 100 may include a folding area 103, a first area 101 disposed at one side (the left side of the folding area 103 shown in FIG. 1) based on the folding area 103, and a second area 102 disposed at the other side (the right side of the folding area 103 shown in FIG. 1).

The division of areas of the display 100 shown in FIG. 1 is exemplary, and the display 100 may be also divided into a plurality of (e.g., four or more or two) areas according to structure or function. For example, in the embodiment shown in FIG. 1, the area of the display 100 may be divided by the folding area 103 extending parallel to the y-axis or the folding axis (A-axis), but in another embodiment, the area of the display 100 may be also divided based on another folding area (e.g., a folding area parallel to the x-axis) or another folding axis (e.g., a folding axis parallel to the x-axis).

The first area 101 and the second area 102 may have generally symmetrical shapes around the folding area 103. However, unlike the first area 101, the second area 102 may include a notch which is cut out according to the presence of the sensor area 224, but in other areas, may have a shape symmetrical to that of the first area 101. In other words, the first area 101 and the second area 102 may include a portion having a shape symmetrical to each other and a portion having a shape asymmetrical to each other.

Hereinafter, the operation of the first housing structure 210 and second housing structure 220 dependent on a state (e.g., a flat state and a folded state) of the electronic device 10, and each area of the display 100, are described.

In an embodiment, when the electronic device 10 is in a flat state (e.g., FIG. 1), the first housing structure 210 and the second housing structure 220 may be disposed to form an angle of about 180 degrees and face the same direction. A surface of the first area 101 of the display 100 and a surface of the second area 102 may form an angle of about 180 degrees to each other, and face the same direction (e.g., a front direction of the electronic device). The folding area 103 may form the same plane as the first area 101 and the second area 102.

In an embodiment, when the electronic device 10 is in a folded state (e.g., FIG. 2), the first housing structure 210 and the second housing structure 220 may disposed to face each other. The surface of the first area 101 of the display 100 and the surface of the second area 102 may form a narrow angle (e.g., between 0 degrees and 10 degrees) and face each other. At least a portion of the folding area 103 may be formed to have a curved surface having a predetermined curvature.

In an embodiment, when the electronic device 10 is in a folded state (e.g., FIG. 2), the first housing structure 210 and the second housing structure 220 may be disposed at a predetermined angle to each other. The surface of the first area 101 of the display 100 and the surface of the second area 102 may form an angle greater than that of the folded state and smaller than that of the flat state. At least a portion of the folding area 103 may be formed to have a curved surface having a predetermined curvature, and the curvature at this time may be smaller than that in the folded state.

Figure 3:
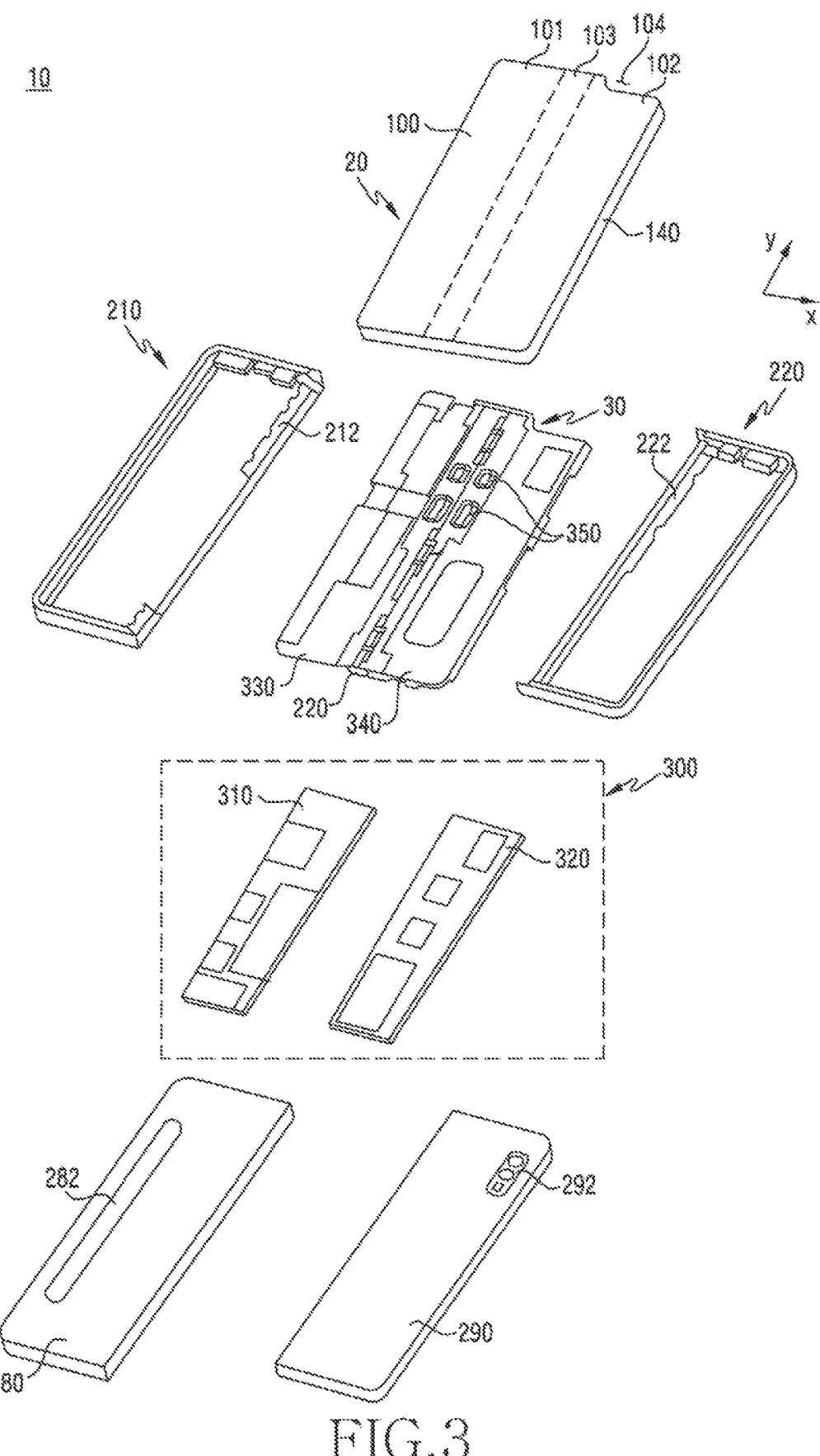
FIG. 3 is an exploded perspective view of an electronic device according to an embodiment.

FIG. 3 is an exploded perspective view of an electronic device according to an embodiment.

Referring to FIG. 3, in an embodiment, the electronic device 10 may include a display part 20, a bracket assembly 30, a substrate part 300, a first housing structure 210, a second housing structure 220, a first rear cover 280, and a second rear cover 290. Herein, the display part 20 may be referred to as a display module or a display assembly.

The display part 20 may include a display 100 and one or more plates or layers 140 on which the display 100 is seated. In an embodiment, the plate 140 may be disposed between the display 100 and the bracket assembly 30. The display 100 may be disposed on at least a portion of one surface (e.g., an upper surface of FIG. 3) of the plate 140. The plate 140 may be formed in a shape corresponding to that of the display 100. For example, a partial area of the plate 140 may be formed in a shape corresponding to a notch 104 of the display 100.

The bracket assembly 30 may include a first bracket 330, a second bracket 340, a hinge structure disposed between the first bracket 330 and the second bracket 340, a hinge cover 230 covering the hinge structure when viewed from the outside, and a wiring member 350 (e.g., a flexible circuit board (FPC)) crossing the first bracket 330 and the second bracket 340.

In an embodiment, the bracket assembly 30 may be disposed between the plate 140 and the substrate part 300. For example, the first bracket 330 may be disposed between the first area 101 of the display 100 and the first substrate 310. The second bracket 340 may be disposed between the second area 102 of the display 100 and the second substrate 320.

In an embodiment, the wiring member 350 and at least a portion of the hinge structure may be disposed inside the bracket assembly 30. The wiring member 350 may be disposed in a direction (e.g., x-axis direction) of crossing the first bracket 330 and the second bracket 340. The wiring member 350 may be disposed in a direction (e.g., x-axis direction) perpendicular to the folding axis (e.g., y-axis or the folding axis A of FIG. 1) of the folding area 103 of the electronic device 10.

The substrate part 300 may include the first substrate 310 disposed at a first bracket 330 side and the second substrate 320 disposed at a second bracket 340 side. The first substrate 310 and the second substrate 320 may be arranged inside a space formed by the bracket assembly 30, the first housing structure 210, the second housing structure 220, the first rear cover 280, and the second rear cover 290. Components for realizing various functions of the electronic device 10 may be mounted on the first substrate 310 and the second substrate 320.

The first housing structure 210 and the second housing structure 220 may be assembled to each other so as to be coupled to both sides of the bracket assembly 30 in a state where the display part 20 is coupled to the bracket assembly 30. The first housing structure 210 and the second housing structure 220 may be slid at both sides of the bracket assembly 30 and be coupled to the bracket assembly 30.

In an embodiment, the first housing structure 210 may include a first rotation support surface 212, and the second housing structure 220 may include a second rotation support surface 222 corresponding to the first rotation support surface 212. The first rotation support surface 212 and the second rotation support surface 222 may include a curved surface corresponding to the curved surface included in the hinge cover 230.

In an embodiment, when the electronic device 10 is in a flat state (e.g., the electronic device of FIG. 1), the first rotation support surface 212 and the second rotation support surface 222 may cover the hinge cover 230 and thus, the hinge cover 230 may not be exposed, or be minimally exposed, to the rear surface of the electronic device 10. Meanwhile, when the electronic device 10 is in a folded state (e.g., the state of FIG. 2), the first rotation support surface 212 and the second rotation support surface 222 may rotate along the curved surface included in the hinge cover 230 and thus, the hinge cover 230 may be maximally exposed to the rear surface of the electronic device 10.

The electronic device 10 of one or more embodiments of the present disclosure may include an electronic device such as a rollable type, a sliding type, a wearable type, a tablet personal computer (PC), and/or a note PC (or a laptop). The electronic device 10 of embodiments of the present disclosure is not limited to the above example, and may include various other electronic devices.

Figure 4:
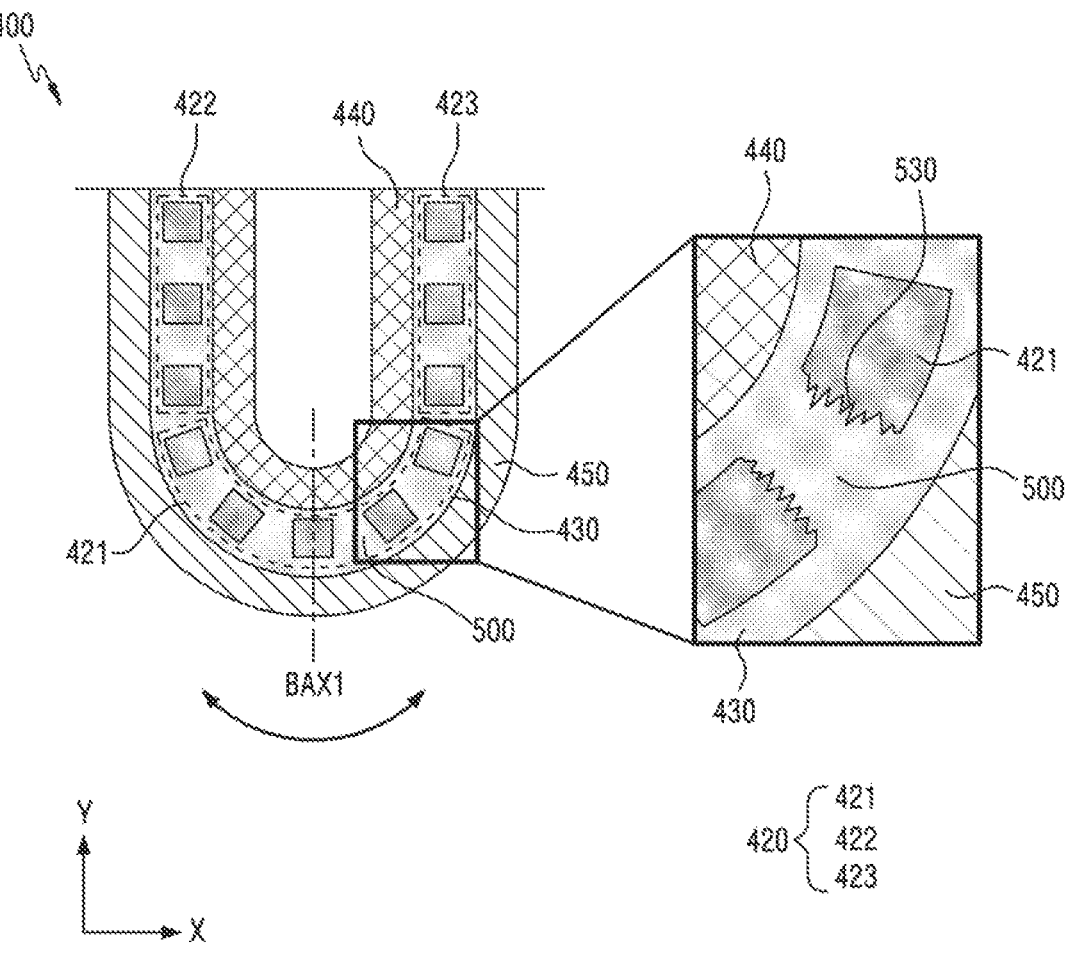
FIG. 4 is a cross-sectional view illustrating a bent shape of a flexible display of a foldable electronic device according to an embodiment.

FIG. 4 is a cross-sectional view illustrating a bent shape of a flexible display of a foldable electronic device according to an embodiment.

The flexible display 400 may be referred to as the display 100 of FIG. 1. Redundant descriptions of the same or substantially the same components as those described above may be omitted.

Referring to FIG. 4, the flexible display 400 of an embodiment may include a glass layer 420, a protective layer 440 and a shock absorbing layer 450. However, embodiments are not limited to that arrangement. The flexible display 400 of an embodiment may omit at least one of the above-described components or may further include at least one component. For example, the flexible display 400 may further include at least one of a display module and a high hardness film layer.

According to an embodiment, the flexible display 400 may include a laminated structure. The laminated structure may be formed by stacking and combining a plurality of members. For example, the shock absorbing layer 450 may be disposed beneath the glass layer 420. The protective layer 440 may be disposed on the glass layer 420. However, embodiments are not limited to this.

The glass layer 420 may include a first flat part 422, a second flat part 423, and a bendable flexible part 421. However, the construction of the glass layer 420 is not limited thereto. For example, the glass layer 420 may omit at least one element among the above elements or may further include at least one element. For example, the glass layer 420 may further include at least one flexible part. According to an embodiment, the glass layer 420 may include a polymer film or a glass material. According to an embodiment, the glass layer 420 may include PI, PET, or ultra-thin glass (UTG).

According to an embodiment, the protective layer 440 may protect other layers (e.g., the glass layer 420 and a display module 410) included in the display 400 from external shock. The protective layer 440 may include a glass material, or be composed of a film layer or a coating layer. The protective layer 440 may include a flexible material. The protective layer 440 may be formed of a transparent material having high light transmittance.

According to an embodiment, the shock absorbing layer 450 (e.g., PET) may protect the display by absorbing the external shock. The shock absorbing layer 450 may be formed to be substantially transparent.

According to an embodiment, the first flat part 422 may be disposed in one area of the first housing structure 210 in FIG. 1. The second flat part 423 may be disposed in one area of the second housing structure 220 in FIG. 1. The flexible part 421 may be disposed between the first flat part 422 and the second flat part 423. However, embodiments are not limited to that arrangement.

According to an embodiment, the glass layer 420 may include a pattern. For example, the glass layer 420 may include a lattice pattern. That is, some areas of the glass layer 420 may have glass disposed in a grid pattern, and an area where no glass is disposed may be filled with another material (e.g., a filling member 430). However, embodiments are not limited to that arrangement. Referring to FIG. 4, the glass layer 420 may include a plurality of slits 500. The plurality of slits 500 may be formed in the flexible part 421. However, embodiments are not limited to this arrangement. For example, the plurality of slits 500 may be formed in at least one of the first flat part 422 and the second flat part 423.

According to an embodiment, the flexible display 400 may include the filling member 430. The filling member 430 may face at least one surface of the glass layer 420. For example, the filling member 430 may face at least one of a first surface facing a first direction (+y-axis direction) of the glass layer 420 or a second surface facing the first surface. The filling member 430 may be also filled in the plurality of slits 500. In another embodiment, the glass layer 420 may be also included inside the filling member 430. The first surface of an embodiment may be defined as an upper surface of the glass layer 420, and the second surface may be defined as a lower surface of the glass layer 420. However, embodiments are not limited to this arrangement.

According to an embodiment, the filling member 430 may be formed of a synthetic resin (e.g., resin), and for example, the synthetic resin may include at least one of acrylic, epoxy, silicone, or urethane. According to an embodiment, the filling member 430 may include an optical clear resin (OCR). According to an embodiment, the filling member 430 may be formed of a material that is relatively more ductile than the glass layer 420.

According to an embodiment, the filling member 430 may include a material having substantially the same refractive index as the glass layer 420, thereby causing the plurality of slits 500 not to be visually visible from the outside.

According to an embodiment, at least a portion of a side surface of the slit 500 may include a rough surface 530. However, embodiments are not limited to this arrangement. For example, at least one of the upper surface or lower surface of the glass layer 420 may include a rough surface 540 in FIG. 6. In another embodiment, while at least a portion of the side surface of the slit 500 includes the rough surface 530, at least one of the upper surface or lower surface of the glass layer 420 may also include the rough surface 540 in FIG. 6.

According to an embodiment, the flexible display 400 may be folded based on a bending axis BAX1. For example, the flexible part 421 of the glass layer 420 may be folded based on the bending axis BAX1. As the flexible display 400 is repeatedly folded, a slip phenomenon may occur between the glass layer 420 and the filling member 430. The rough surface may increase an adhesion area and frictional force between the glass layer 420 and the filling member 430. Accordingly, the rough surface may prevent the slip phenomenon and increase an adhesive force between the glass layer 420 and the filling member 430, thereby preventing a peeling phenomenon from occurring in the flexible display 400.

Figure 5:
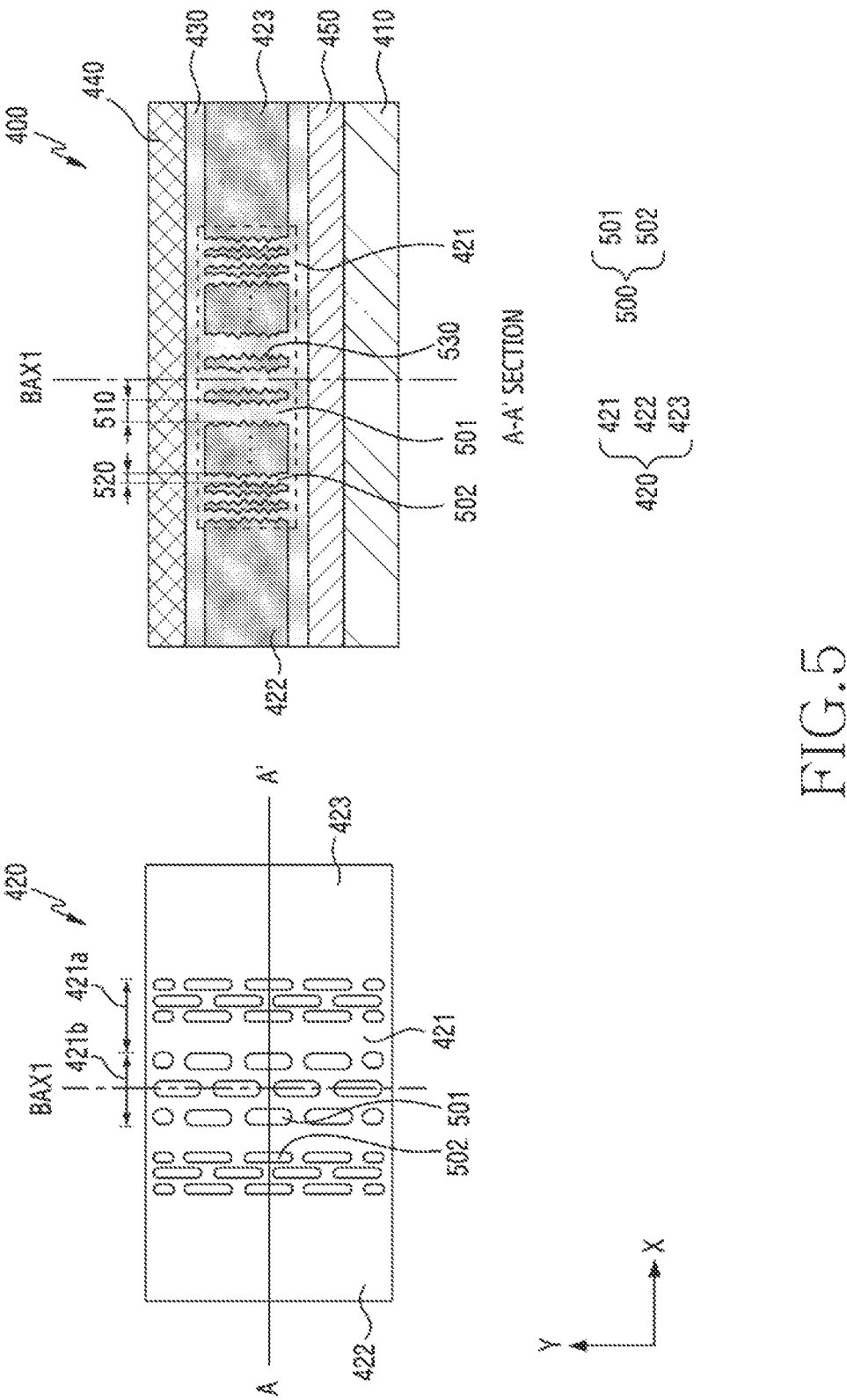
FIG. 5 is a cross-sectional view illustrating structures of glass including a plurality of slits and a flexible display including the glass according to an embodiment.

FIG. 5 is a cross-sectional view illustrating glass including a plurality of slits and a flexible display including the glass according to an embodiment.

Referring to FIG. 5, a protective layer 440 may be disposed on a glass layer 420 of the flexible display 400. A shock absorbing layer 450 may be disposed beneath the glass layer 420. A display module 410 may be disposed on a rear surface of the shock absorbing layer 450. A filling member 430 may be disposed between the glass layer 420 and the shock absorbing layer 450. However, embodiments are not limited to this arrangement. For example, the filling member 430 may be also disposed between the protective layer 440 and the glass layer 420. In an embodiment, the glass layer 420 and the protective layer 440 may also overlap with each other. In another embodiment, the glass layer 420 and the shock absorbing layer 450 may also overlap with each other.

According to an embodiment, the glass layer 420 may include a pattern. The pattern may include a lattice pattern. However, embodiments are not limited to this arrangement. Referring to FIG. 5, the glass layer 420 may include a plurality of slits 500. The plurality of slits 500 may be formed in a flexible part 421 of the glass layer 420. However, embodiments are not limited to this arrangement. For example, the plurality of slits 500 may be formed in a first flat part 422 or a second flat part 423 of the glass layer 420.

According to an embodiment, the flexible part 421 may include a first area 421*a* and a second area 421*b*. The second area 421*b* may be an area being closer to the bending axis BAX1 than the first area 421*a* or including the bending axis BAX1. For example, the first area 421*a* may be an area closer to the first flat part 422 and second flat part 423 than the second area 421*b*.

According to an embodiment, the second area 421*b* may have a greater flexural strength than the first area 421*a*. That is, the closer to the bending axis BAX1, the flexural strength may increase. The flexural strength may mean a strength that the glass layer 420 may withstand when the flexible display 400 is folded.

According to an embodiment, the widths of the plurality of slits 500 may be different for each area of the glass layer 420. For example, the widths of the plurality of slits 500 may be greater in the second area 421*b* than in the first area 421*a* of the flexible part 421. That is, the closer to the bending axis BAX1, the wider the slit 500 may be. For example, referring to FIG. 5, the width 510 of a first slit 501 may be greater than the width 520 of a second slit 502.

In another embodiment, the glass layer 420 may also include a plurality of recesses that are formed to a predetermined depth without being fully open. The shape, depth, or size of the recess may be different for each area of the glass layer 420. For example, the widths of the plurality of recesses may be greater in the second area 421*b* than in the first area 421*a* of the flexible part 421.

According to an embodiment, at least one surface of the glass layer 420 may include a rough surface. For example, side surfaces of the plurality of slits 500 of the glass layer 420 may include rough surfaces 530. The side surfaces of the plurality of slits 500 may mean surfaces facing the glass of the glass layer 420 with the plurality of slits 500 interposed therebetween. However, embodiments are not limited to this arrangement. For example, at least a portion of at least one of an upper surface and lower surface of the glass layer 420 may also include a rough surface 540 in FIG. 6. In another embodiment, while the side surfaces of the plurality of slits 500 of the glass layer 420 include the rough surfaces 530, at least one of the upper surface or lower surface of the glass layer 420 may also include a rough surface 540 in FIG. 6.

According to an embodiment, the roughness of the rough surface 530 and the rough surface 540 may be formed by performing a polishing process of a computer numerical control (CNC)-machined surface. However, embodiments are not limited to this arrangement. For example, the roughness of the rough surface 530 and the rough surface 540 may be formed by performing a laser or etching process.

According to an embodiment, the rough surface 530 and the rough surface 540 of the plurality of slits 500 may include at least one of a stripe, an octagonal pattern, or an amorphous shape. However, embodiments are not limited to this arrangement. For example, the rough surface may include various shapes according to process conditions. Referring to FIG. 5, the rough surface may also include the shape of a plurality of protrusion parts.

According to an embodiment, the surface roughness (degree of roughness) of the side surfaces of the plurality of slits 500 may be Ra0.01 um to 1 um. However, embodiments are not limited to this arrangement.

Figure 6:
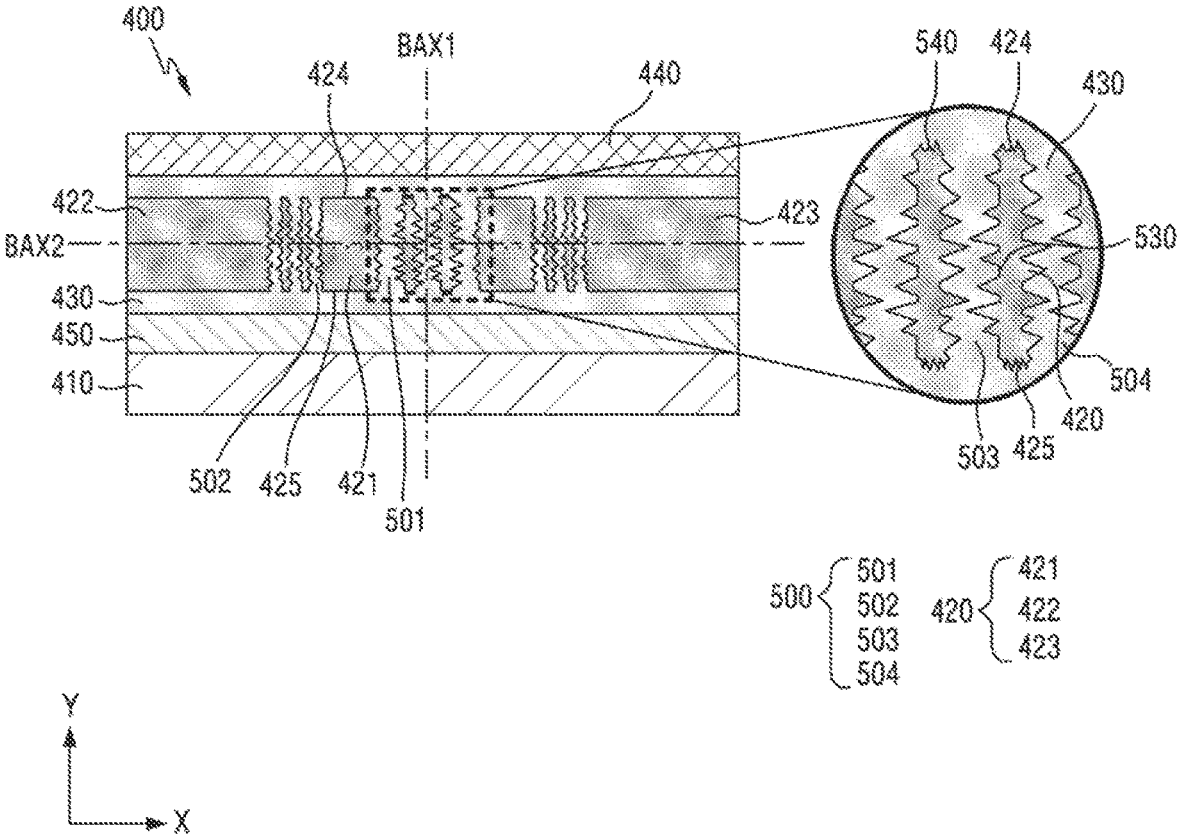
FIG. 6 is a cross-sectional view illustrating a structure of a flexible display according to another embodiment.

FIG. 6 is a cross-sectional view illustrating a flexible display according to an embodiment.

The construction of the flexible display 400 may be referred to by the flexible display 400 of FIG. 4 and FIG. 5.

The same reference numerals are used for the same or substantially the same components as those described above, and redundant descriptions may be omitted.

According to an embodiment, a flexible part 421 may include a first area and a second area. The contents of the first area and the second area may be referred to by the first area 421*a* and the second area 421*b* of FIG. 5.

Referring to FIG. 6, the glass layer 420 may include a first surface 424 facing a first direction (+Y-axis direction) and a second surface 425 opposite to the first surface 424. At least a portion of the first surface 424 and at least a portion of the second surface 425 may be defined as an upper surface and lower surface of the glass layer 420, respectively. However, embodiments are not limited to this arrangement.

According to an embodiment, the roughness of the rough surfaces 530 formed on the side surfaces of the plurality of slits 500 may be different for each of the plurality of slits. For example, the roughness of the rough surfaces 530 may be different for each area of the flexible part 421. That is, since a flexural strength increases as it is closer to a bending axis BAX1 of the glass layer 420, the roughness of the rough surface 530 of the plurality of slits 500 may increase as it is closer to the bending axis BAX1. For example, the roughness of the rough surfaces 530 of the plurality of slits 500 may be greater in the second area than in the first area. Referring to FIG. 6, the roughness of a rough surface of the first slit 501 may be greater than the roughness of a rough surface of the second slit 502. However, embodiments are not limited to this arrangement.

According to an embodiment, the roughness of the rough surfaces 530 formed on the side surfaces of the plurality of slits 500 may not be constant within one slit. Referring to FIG. 6, the roughness of the rough surface 530 may increase as it goes from the first surface 424 or second surface 425 toward a central axis BAX2 of the glass layer 420. That is, the roughness of the rough surface 530 may increase as it goes from one end of each of the plurality of slits 500 or the other end opposite to the one end toward the inside (or center) of the slit 500. However, embodiments are not limited to this arrangement.

According to an embodiment, at least one of the upper surface and lower surface of the glass layer 420 may include the rough surface 540. For example, at least one of the upper surface or lower surface of the flexible part 421 may include the rough surface 540. However, embodiments are not limited to this arrangement. For example, at least one surface of a first flat part 422 or a second flat part 423 may also include the rough surface 540. Referring to FIG. 6, at least a portion of at least one of the first surface 424 or the second surface 425 may include the rough surface 540. An area including the rough surface 540 on the first surface 424 or second surface 425 may be an area between the plurality of slits 500. For example, the rough surface 540 may be formed on the first surface 424 or second surface 425 of the glass layer 420 between a third slit 503 and a fourth slit 504.

According to an embodiment, the roughness of the rough surface 540 included in the first surface 424 or second surface 425 may be different according to a location within the glass layer 420. For example, the roughness of the rough surface 540 may be different for each area of the flexible part 421. That is, since a flexural strength increases as it is closer to the bending axis BAX1 of the glass layer 420, the roughness of the rough surface 540 included in the first surface 424 or second surface 425 may increase as it is closer to the bending axis BAX1. For example, the roughness of the rough surfaces 540 of the plurality of slits 500 may be greater in the second area 421b in FIG. 5 than in the first area 421a in FIG. 5. However, embodiments are not limited to this arrangement.

According to an embodiment, the rough surface 530 and the rough surface 540 may include a plurality of protrusion parts. The degree of protrusion of the protrusion part may be different according to the area of the glass layer 420. Referring to FIG. 6, the degree of protrusion of the protrusion part may increase as it is closer to the bending axis BAX1 of the glass layer 420. That is, the height of the protrusion part may increase as it is closer to the bending axis BAX1 of the glass layer 420. However, embodiments are not limited to this arrangement.

According to an embodiment, the degree of protrusion of the protrusion part may be different within the slit 500. Referring to FIG. 6, the degree of protrusion of the protrusion part may increase as it is closer to the central axis BAX2 of the glass layer 420. That is, the closer to the central axis BAX2 of the glass layer 420, the higher the height of the protrusion part may be. However, embodiments are not limited to this arrangement.

Figure 7:
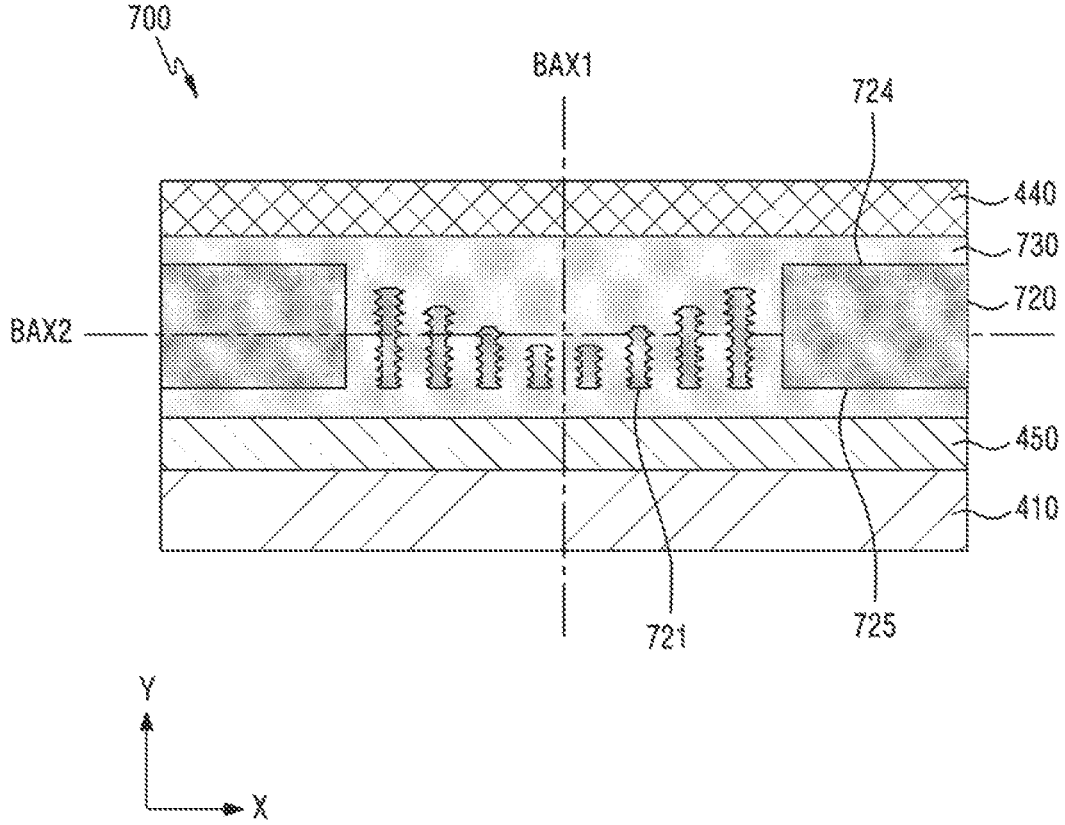
FIG. 7 is a cross-sectional view illustrating a structure of a flexible display according to a further embodiment.

FIG. 7 is a cross-sectional view illustrating a flexible display according to an embodiment.

The construction of the flexible display 700 may be referred to by the flexible display 400 of FIG. 4, FIG. 5, and FIG. 6. The same reference numerals are used for the same or substantially the same components as those described above, and redundant descriptions may be omitted.

According to an embodiment, a flexible part 721 may include a first area and a second area. The contents of the first area and the second area may be referred to by the first area 421a and the second area 421b of FIG. 5.

According to an embodiment, a glass layer 720 may include a first surface 724 facing a first direction (+Y axis direction) and a second surface 725 facing the first surface 724. The contents of the first surface 724 and the second surface 725 may be referred to by the first surface 424 and the second surface 425 of FIG. 6.

Referring to FIG. 7, the thickness of the glass layer 720 may be different depending on its location within the glass layer 720. For example, the thickness of the first area of the flexible part 721 may be greater than that of the second area. That is, the thickness of the flexible part 721 may decrease as it goes toward the bending axis BAX1 having a greater flexural strength.

According to an embodiment, as the thickness of the flexible part 721 changes, the shape of the flexible part 721 may change. For example, as shown in FIG. 7, the first surface 724 of the glass layer 720 may have a concave shape, and the second surface 725 may include a flat surface. However, embodiments are not limited to this arrangement. For example, the first surface 724 may include a flat surface, and the second surface 725 may also include a concave shape. According to another embodiment, the first surface 724 and the second surface 725 may also include concave shapes symmetrical about the central axis BAX2 of the glass layer 720.

According to an embodiment, the shape of the glass layer 720 may be formed through a CNC machining process. However, embodiments are not limited to this arrangement. For example, the shape of the glass layer 720 may be also formed through a chemical etching process or a groove excavation process using a mechanical method.

According to an embodiment, the flexible display 700 may include a filling member 730. The filling member 730 may face at least one surface of the first surface 724 or second surface 725 of the glass layer 720. The filling member 730 may be also filled within a slit of the glass layer 720. The contents of the filling member 730 may be referred to by the filling member 430 of FIG. 4, FIG. 5, and FIG. 6.

According to an embodiment, the thickness of the filling member 730 may vary as the thickness of the flexible part 721 varies. Referring to FIG. 7, the thickness of the filling member 730 may increase as it is closer to the bending axis BAX1. However, embodiments are not limited to this arrangement.

Figure 8:
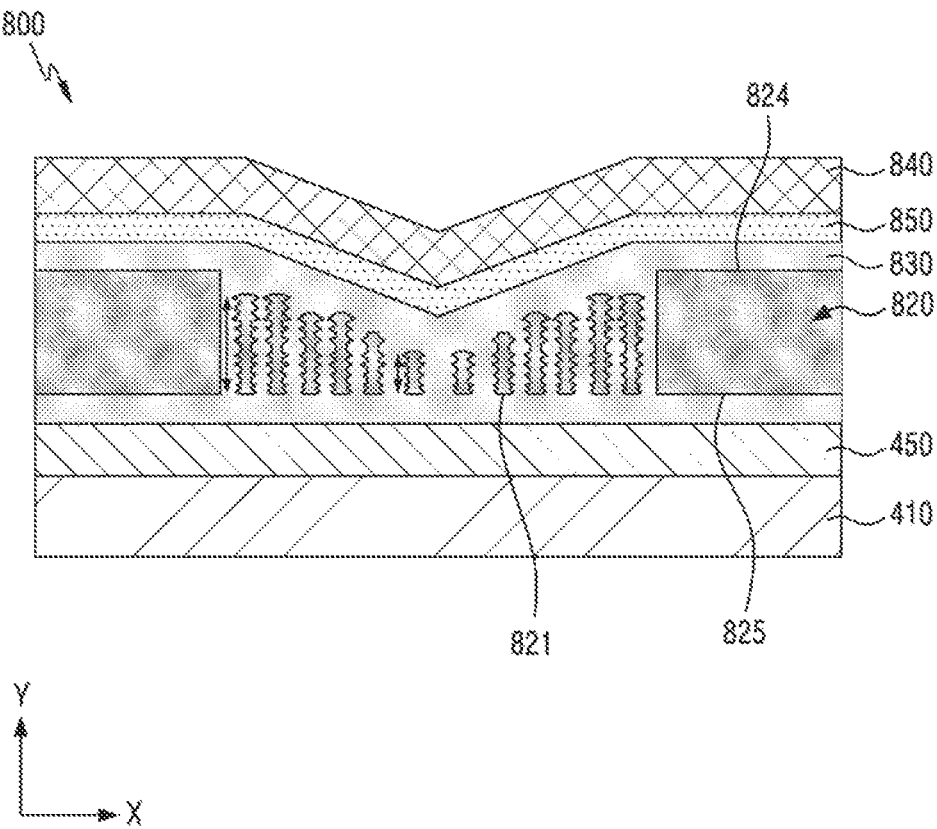
FIG. 8 is a cross-sectional view illustrating a structure of a flexible display according to a further another embodiment.

FIG. 8 is a cross-sectional view illustrating a flexible display according to an embodiment.

The construction of the flexible display 800 may be referred to by the flexible display 700 of FIG. 7. The same reference numerals are used for the same or substantially the same components as those described above, and redundant descriptions may be omitted.

According to an embodiment, the thickness of a filling member 830 may vary as the thickness of a glass layer 820 varies. Referring to FIG. 8, the thickness of the filling member 830 may decrease as it is closer to the bending axis BAX1. However, embodiments are not limited to this arrangement.

Referring to FIG. 8, the flexible display 800 may further include a protective layer 840 and a high hardness film layer 850. The high hardness film layer 850 may be disposed on the glass layer 820. For example, the high hardness film layer 850 may face the glass layer 820. According to an embodiment, when the filling member 830 is disposed on a first surface 824 of the glass layer 820, the high hardness film layer 850 may be disposed on an upper surface of the filling member 830. That is, the filling member 830 and the high hardness film layer 850 may face each other.

According to an embodiment, the shape of the high hardness film layer 850 may vary depending on the shape of the glass layer 820 or filling member 830. Referring to FIG. 8, the first surface 824 of the glass layer 820 may have a concave shape. Accordingly, the high hardness film layer 850 may have a concave shape. For example, an area of the high hardness film layer 850 corresponding to the flexible part 821 of the glass layer 820 may have a concave shape. However, embodiments are not limited to this arrangement.

According to an embodiment, the shape of the protective layer 840 may vary depending on the shape of the glass layer 820 or high hardness film layer 850. For example, referring to FIG. 8, as the first surface 824 of the glass layer 820 or the high hardness film layer 850 includes a concave shape in the −Y axis direction, the protective layer 840 may include a concave shape. For example, an area of the protective layer 840 corresponding to the flexible part 821 of the glass layer 820 may include a concave shape. However, embodiments are not limited to this arrangement.

Figure 9:
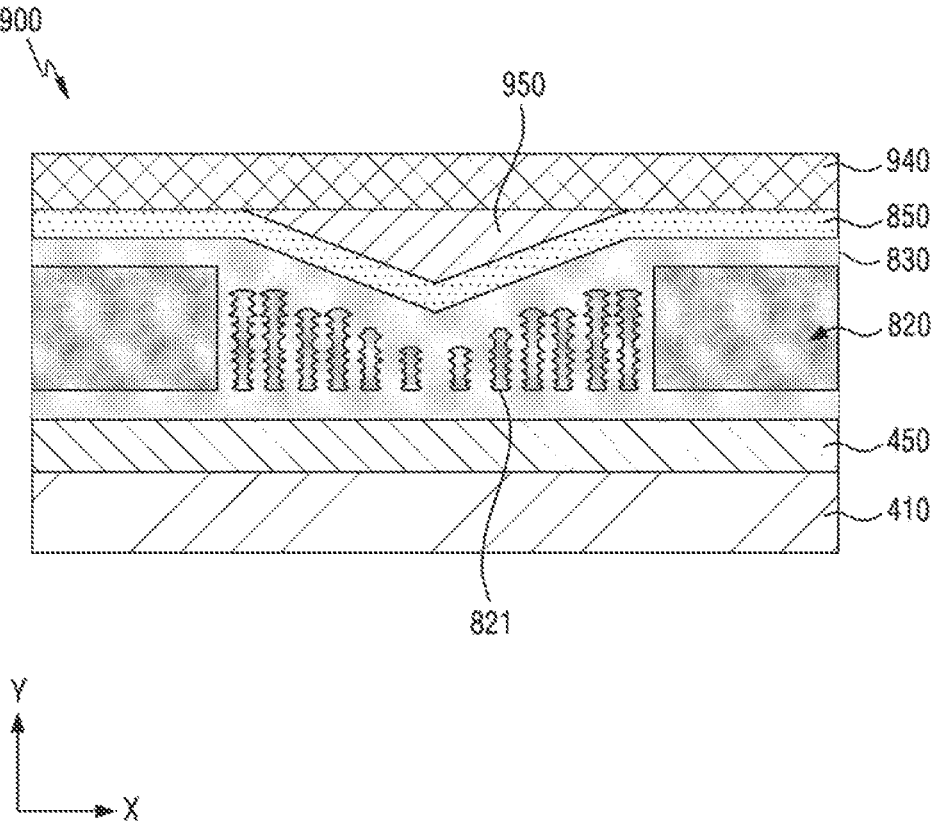
FIG. 9 is a cross-sectional view illustrating a structure of a flexible display according to a yet another embodiment.

FIG. 9 is a cross-sectional view illustrating a flexible display according to an embodiment.

The construction of the flexible display 900 may be referred to by the flexible display 700 and flexible display 800 of FIG. 7 and FIG. FIG. 8. The same reference numerals are used for the same or substantially the same components as those described above, and redundant descriptions may be omitted.

Referring to FIG. 9, when a glass layer 820 and a high hardness film layer 850 of an embodiment have concave shapes, at least one space may be formed on an upper surface of the high hardness film layer 850. According to an embodiment, a filling member 950 may be filled in the space. The filling member 950 may be filled in the space so that one surface of the filling member 950 and the high hardness film layer 850 may form a plane.

According to an embodiment, a protective layer 940 may be disposed on an upper surface of the plane formed by the filling member 950 and the high hardness film layer 850. Accordingly, the protective layer 940 may have a flat shape. However, embodiments are not limited to this arrangement.

Figure 10:
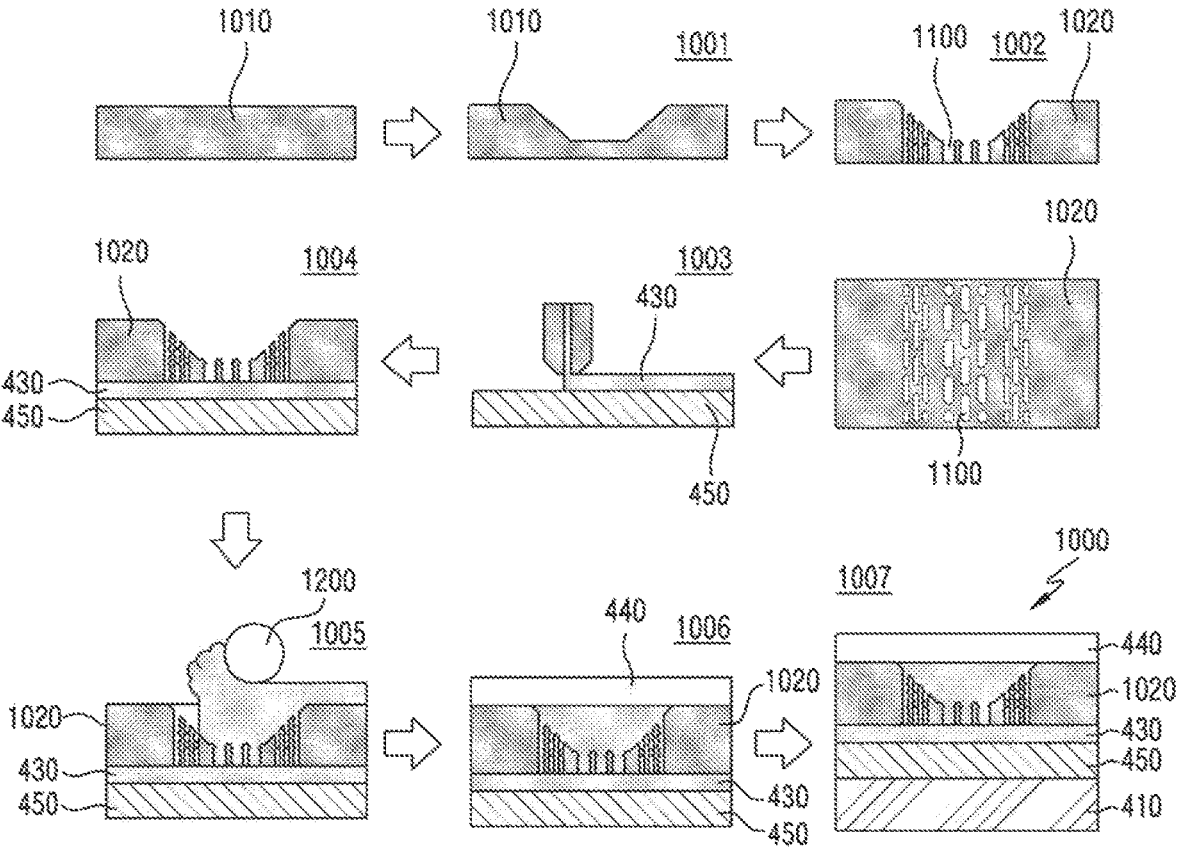
FIG. 10 is a diagram illustrating a manufacturing process of a flexible display according to an embodiment.

FIG. 10 is a diagram illustrating a manufacturing process of a flexible display according to an embodiment.

The construction of the flexible display 1000 formed by the flexible display manufacturing process of an embodiment may be referred to by the flexible display 400, the flexible display 700, the flexible display 800, and the flexible display 900 of FIG. 4, FIG. 5, FIG. 6, FIG. 7, FIG. 8, and FIG. 9. Redundant descriptions of the same or substantially the same components as those described above may be omitted.

Referring to FIG. 10, the manufacturing process of the flexible display may include a glass member processing process 1001, a glass member pattern and slit processing process 1002, filling member coating process 1003, filling member coating process 1004, filling member coating process 1005, a protective layer coupling process 1006, and a display module coupling process 1007. However, the manufacturing process of the flexible display is not limited thereto. For example, the process may omit at least one process from among the above processes or may also further include at least one other process.

According to an embodiment, in the glass member processing process 1001, the shape of a glass member 1010 may be processed. For example, in the above process, the glass member 1010 may be processed into a shape of being concave in one direction like the shape of the glass layer 820 of FIG. 9. However, embodiments are not limited to this arrangement. The glass member 1010 may be processed through a CNC process or a chemical etching process. However, embodiments are not limited to this arrangement.

According to an embodiment, in the glass member pattern and slit processing process 1002, a pattern of the glass member 1010 and a plurality of slits 1100 may be formed. Also, in the above process, rough surfaces may be formed on side surfaces of the plurality of slits 1100 or at least one surface of the glass layer 1020. At least one of the pattern, the plurality of slits 1100 or the rough surface may be formed by a femto laser process or a chemical etching process. However, embodiments are not limited to this arrangement.

According to an embodiment, in the filling member coating processes 1003, the filling member coating process 1004, and the filling member coating process 1005, a filling member 430 may be disposed. In the filling member coating process 1003, the filling member 430 may be coated on an upper surface of a shock absorbing layer 450. In the above process, the filling member 430 may be coated using a slot die coater. However, embodiments are not limited to this arrangement. In the filling member coating process 1004, the glass layer 1020 may be disposed on an upper surface of the coated filling member 430. In the filling member coating process 1005, the filling member 430 may be coated and/or filled on the upper surface of the glass layer 1020 and inside the plurality of slits 1100. The filling member 430 may be coated and/or filled in the glass layer 1020 to hide the pattern of the glass layer 1020. However, embodiments are not limited to this arrangement. For example, in the above process, the filling member 430 may be disposed to face at least one of an upper surface or lower surface of the glass layer 1020. In the above process, the filling member 430 may be filled and/or coated with a bar 1200. For example, the filling member 430 may be filled and/or coated with a bar coater or a spin coater. However, embodiments are not limited to this arrangement.

According to an embodiment, in the protective layer coupling process 1006 and the display module coupling process 1007, the glass layer 1020, a protective layer 440, and a display module 410 may be coupled. The protective layer 440 may be disposed on the glass layer 1020. The display module 410 may be disposed under the glass layer 1020. For example, the display module 410 may face a rear surface of the shock absorbing layer 450. However, embodiments are not limited to this arrangement.

As described above, an electronic device (e.g., the electronic device 10 of FIG. 1) of an embodiment may include a hinge structure, a first housing connected to the hinge structure, a second housing connected to the first housing through the hinge structure so as to be rotatable with respect to the first housing, and a flexible display disposed in one area of the first housing and one area of the second housing and being foldable according to the rotation. The flexible display may include a glass layer. The glass layer may include a plurality of slits and include a flexible part disposed to be bendable. At least a portion of side surfaces of the plurality of slits may include a rough surface.

According to an embodiment, the flexible part may include a first area, and a second area closer to a bending axis of the glass layer than the first area or including the bending axis. The plurality of slits may have a greater roughness of a rough surface in the second area than the first area.

According to an embodiment, the roughness of the rough surfaces of the plurality of slits may increase as it goes from one end of the plurality of slits or the other end opposite to the one end toward the center of the slit.

According to an embodiment, the glass layer may include a first surface facing a first direction and a second surface facing the first surface, and at least a portion of at least one of the first surface or second surface may include a rough surface.

According to an embodiment, an area of the first surface or second surface including the rough surface may be an area between the plurality of slits.

According to an embodiment, the glass layer may include a first surface facing a first direction and a second surface facing the first surface, and the flexible display may include a filling member facing at least one of the first surface or second surface and filled inside the slit.

According to an embodiment, the flexible part may include a first area, and a second area closer to a bending axis of the glass layer than the first area or including the bending axis. The plurality of slits may have a greater width of the slit in the second area than the first area.

According to an embodiment, the flexible part may include a first area, and a second area closer to the bending axis of the glass layer than the first area or including the bending axis. The thickness of the first area may be greater than that of the second area.

According to an embodiment, the glass layer may include a first surface facing a first direction and a second surface facing the first surface, and the flexible display may include a filling member facing at least one of the first surface or second surface and filled inside the slit.

According to an embodiment, the flexible display may further include a high hardness film layer disposed on the first surface.

According to an embodiment, the flexible display may further include a protective layer disposed on the high hardness film layer, and the filling member may be filled in at least a part between the high hardness film layer and the protective layer.

As described above, a flexible display (e.g., the flexible display 400 of FIG. 4) of an embodiment may include a glass layer, and the glass layer may include a plurality of slits, and include a flexible part disposed to be bendable, and at least a portion of side surfaces of the plurality of slits may include a rough surface.

According to an embodiment, the flexible part may include a first area and a second area closer to a bending axis of the glass layer than the first area or including the bending axis, and the roughness of the rough surfaces of the second area of the plurality of slits may be greater than that of the first area.

According to an embodiment, the roughness of the rough surfaces of the plurality of slits may increase as it goes from one end of the plurality of slits or the other end opposite to the one end of the plurality of slits toward the center of the slits.

According to an embodiment, the glass layer may include a first surface facing a first direction and a second surface facing the first surface, and at least a portion of at least one of the first surface or second surface may include a rough surface.

According to an embodiment, the glass layer may include a first surface facing a first direction and a second surface facing the first surface, and the flexible display may include a filling member facing at least one of the first surface or the second surface and filled inside the slit.

According to an embodiment, the flexible part may include a first area and a second area closer to a bending axis of the glass layer than the first area or including the bending axis, and the thickness of the first area is greater than that of the second area.

According to an embodiment, the glass layer may include a first surface facing a first direction and a second surface facing the first surface, and the flexible display may include a filling member facing at least one of the first surface or the second surface and filled inside the slit.

According to an embodiment, the flexible display may further include a high hardness film layer disposed on the first surface.

According to an embodiment, the flexible display may further include a protective layer disposed on the high hardness film layer, and a filling member may be filled in at least a part between the high hardness film layer and the protective layer.

What is claimed is:
1. An electronic device comprising:
a first housing;
a second housing;
a hinge structure foldably connecting the first housing and the second housing to each other; and
a flexible display comprising a first portion on the first housing and a second portion on the second housing, the flexible display being foldable according to folding of the first housing and the second housing with respect to each other,
wherein the flexible display comprises a glass layer,
wherein the glass layer comprises a flexible part that is bendable and comprises a plurality of slits, and
wherein at least a portion of a side surface of each of the plurality of slits comprises a rough surface.
2. The electronic device of claim 1, wherein the flexible part comprises:
a first area; and a second area that is closer than the first area to a bending axis of the glass layer, and
wherein the rough surfaces of slits in the second area, among the plurality of slits, have a roughness that is greater than a roughness of the rough surfaces of slits in the first area, among the plurality of slits.
3. The electronic device of claim 1, wherein a roughness of the rough surface of each slit of the plurality of slits increases from an end of the slit toward a center of the slit.
4. The electronic device of claim 1, wherein the glass layer further comprises a first surface facing a first direction, and a second surface facing the first surface, and
wherein at least a portion of at least one of the first surface or the second surface comprises a second rough surface.
5. The electronic device of claim 4, wherein the at least one of the first surface or the second surface comprising the second rough surface is in an area between the plurality of slits.
6. The electronic device of claim 1, wherein the glass layer further comprises a first surface facing a first direction and a second surface facing the first surface, and
wherein the flexible display further comprises a filling member facing at least one of the first surface or the second surface and filled inside at least one of the plurality of slits.
7. The electronic device of claim 1, wherein the flexible part further comprises:
a first area; and
a second area that is closer than the first area to a bending axis of the glass layer or comprises the bending axis, and
wherein slits in the second area, among the plurality of slits have a width that is greater than a width of slits in the first area, among the plurality of slits.
8. The electronic device of claim 1, wherein the flexible part further comprises:
a first area; and
a second area that is closer than the first area to a bending axis of the glass layer or comprises the bending axis, and
wherein a thickness of the first area is greater than a thickness of the second area.
9. The electronic device of claim 8, wherein the glass layer further comprises a first surface facing a first direction, and a second surface facing the first surface, and
wherein the flexible display further comprises a filling member facing at least one of the first surface or the second surface and filled inside at least one of the plurality of slits.
10. The electronic device of claim 9, wherein the flexible display further comprises a film layer on the first surface.
11. The electronic device of claim 10, wherein the flexible display further comprises a protective layer on the film layer, and
wherein the filling member is filled in at least a part between the film layer and the protective layer.
12. A flexible display comprising a glass layer,
wherein the glass layer comprises a flexible part that is bendable and comprises a plurality of slits, and
wherein at least a portion of a side surface of each of the plurality of slits comprises a rough surface.
13. The flexible display of claim 12, wherein the flexible part comprises:
a first area; and
a second area that is closer than the first area to a bending axis of the glass layer, and wherein the rough surfaces of slits in the second area, among the plurality of slits, have a roughness that is greater than a roughness of the rough surfaces of slits in the first area, among the plurality of slits.

14. The flexible display of claim 12, wherein a roughness of the rough surface of each slit of the plurality of slits increases from an end of the slit toward a center of the slit.

15. The flexible display of claim 12, wherein the glass layer further comprises a first surface facing a first direction, and a second surface facing the first surface, and wherein at least a portion of at least one of the first surface or the second surface comprises a second rough surface.

16. The flexible display of claim 12, wherein the glass layer further comprises a first surface facing a first direction and a second surface facing the first surface, and wherein the flexible display further comprises a filling member facing at least one of the first surface or the second surface and filled inside at least one of the plurality of slits.

17. The flexible display of claim 12, wherein the flexible part further comprises:

a first area; and a second area that is closer than the first area to a bending axis of the glass layer or comprises the bending axis, and wherein a thickness of the first area is greater than a thickness of the second area.

18. The flexible display of claim 17, wherein the glass layer further comprises a first surface facing a first direction, and a second surface facing the first surface, and wherein the flexible display further comprises a filling member facing at least one of the first surface or the second surface and filled inside at least one of the plurality of slits.

19. The flexible display of claim 18, wherein the flexible display further comprises a film layer on the first surface.

20. The flexible display of claim 19, wherein the flexible display further comprises a protective layer on the film layer, and wherein the filling member is filled in at least a part between the film layer and the protective layer.

* * * * *